United States Patent Office 3,258,919
Patented July 5, 1966

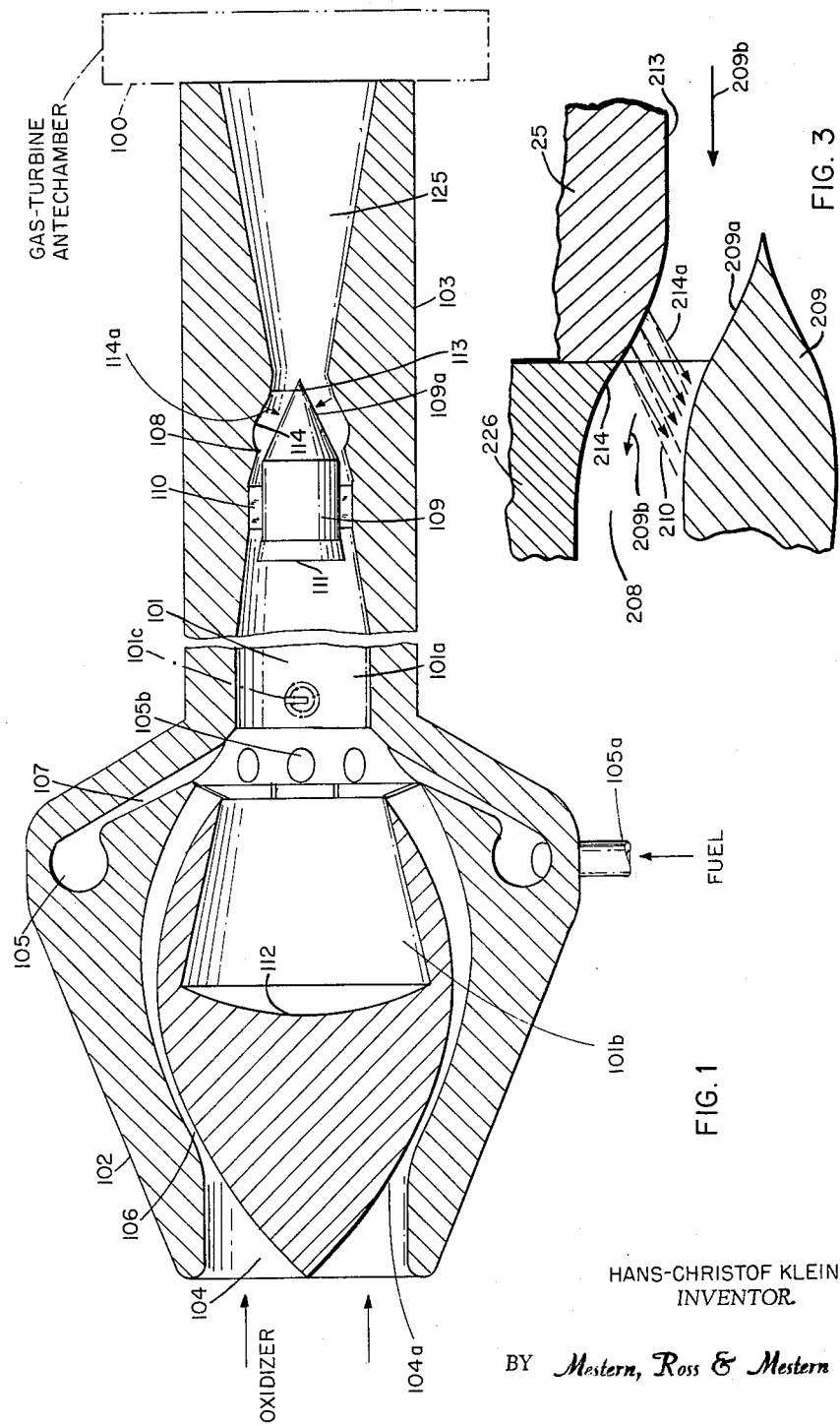

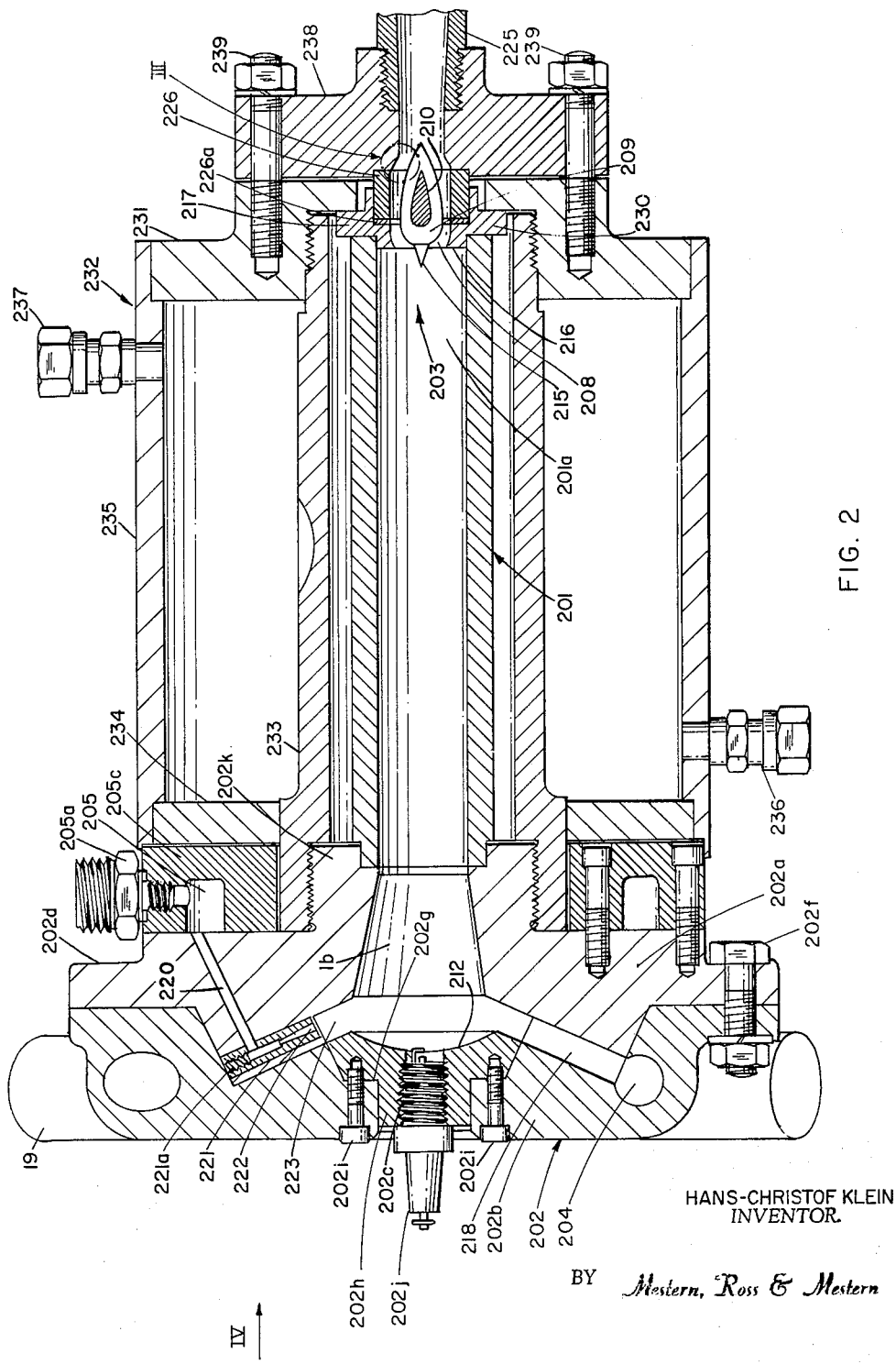

3,258,919
AERODYNAMIC VALVES AND APPARATUS
INCORPORATING SAME
Hans-Christof Klein, Hattersheim (Main), Germany, assignor to Alfred Teves KG, Frankfurt, Germany, a corporation of Germany
Filed July 23, 1964, Ser. No. 384,692
Claims priority, application Germany, July 27, 1963,
T 24,384
10 Claims. (Cl. 60—39.77)

The present invention relates to aerodynamic valves and apparatus incorporating same. More particularly, the subject matter of the present development is a valve system of the aerodynamic type, i.e. operating without a movable closure member, to establish a fluid barrier to the passage of a gas or liquid in one direction while permitting the fluid to flow in the opposite direction. Valves of this type are characterized by a passage with inlet and outlet sides of different cross-sections in the direction of flow of the fluid so that the fluid flow finds greater resistance in one direction than in the other.

Valve systems of the afore-described type are of particular importance when it is desired to convert the energy of the fluid from one form to another. Thus it is known to use aerodynamic valves which are adapted to convert the kinetic energy of a moving gas stream into potential energy, i.e. a pressure increase, at the input to a gas turbine. In some cases, valves of this general type can be used to convert potential energy of a gas under pressure into kinetic energy of gas movement. Aerodynamic valves of this character frequently do not operate at maximum efficiency since the requisite pressure differential between the inlet and outlet often is reduced during operation of the valve, especially when the latter must pass thrust pulses or pressure waves. When an aerodynamic valve is provided at the inlet to a working chamber maintained at a constant elevated pressure, the differential referred to above also is severely reduced. Since a high pressure differential has, for the most part, been considered absolutely essential for operating valves of the character described at maximum efficiency, such valves have not found widespread acceptance in cases where this differential could be reduced by the build-up of pressure at the outlet side of the valve system. When aerodynamic valves were used in such cases, they operated with a reduced efficiency and were thus not able to ensure that substantially no reverse flow of gases would occur.

It is the principal object of the present invention to provide an aerodynamic valve of improved efficiency.

Another object of this invention is to provide a valve system of the character described, wherein the disadvantages of earlier systems can be obviated.

These objects and others which will become apparent hereinafter are attained, in accordance with the present invention, by a valve system so constructed and arranged that an auxiliary barrier is developed along the path of a gas flow from inlet to outlet to counter or intercept any reverse flow of gases arising from a momentary or sustained drop in the pressure differential between the inlet and outlet sides of the valve. This auxiliary barrier can be viewed in terms of an aiding gas stream whose energy is derived from a source other than the gases normally flowing from the inlet to the outlet and oriented generally transversely to this direction of flow of the gas stream, so that the aiding gas stream intersects the main gas flow.

According to one aspect of this invention, an aerodynamic valve of the character described and provided with an inlet and outlet communicating with one another is so dimensioned that the resistance to flow of the gases is greater in the rearward direction than in the forward direction and is formed as an inlet valve to a combustion chamber in which a pulsating thrust wave is produced. The detonation chamber can be connected to a working chamber, e.g. the antechamber of a gas turbine, which has a relatively high pressure so that the efficiency of the aerodynamic valve connecting it with the combustion chamber would normally be reduced in the absence of the aiding gas stream. According to this first aspect of the invention, however, the aiding gas stream, for producing a dynamic barrier to the reverse flow of gases in addition to the resistance barrier resulting from the dimensioning of the inlet and outlet portions of the aerodynamic valve, has a kinetic energy from a source external of the detonation chamber. The external source of kinetic energy can include means for supplying one of the components of the gas mixture to be detonated at an elevated velocity.

According to another aspect of this invention, the aiding gas stream is produced by the return thrust of gases in a direction opposite the normal mode of flow by forming the duct at which the return thrust enters the aerodynamic valve with a concave reflecting surface such that at least part of this return thrust is reflected or guided transversely to its main flow stream. The transversely aiding gas stream thus develops the auxiliary barrier. It will be understood that the pressure of the working chamber, which constitutes the driving force for the reverse thrust of gas, is the source of external energy for the auxiliary barrier mentioned above. In both cases it is desirable that the passages through which the incoming gases flow be formed with constrictions so that the velocity of the auxiliary-barrier gas is increased and, when the barrier is required, the potential energy or pressure of the gas is higher on the side of the constriction opposite that at which the gas forms the auxiliary barrier. Advantageously, the barrier to the rearward flow of gases is produced by an annular concavity formed in the wall of the outlet duct of an aerodynamic valve communicating with the antechamber of a gas turbine or other gas-driven machine and at the end or outlet side of a combustion chamber in which the driving gas is produced.

When an aerodynamic valve serves as the inlet valve to a combustion chamber of this latter type, the means for producing the auxiliary barrier can include at least one but preferably a plurality of inlet nozzles for one of the components of the combustible gas mixture, which nozzles communicate with the valve compartment. The axes of these nozzles extend generally transversely to the axis of the aerodynamic valve and are produced with the aforementioned constrictions so that the pressure or potential energy of a gaseous component introduced from the exterior is converted into kinetic energy at the valve compartment. When the aerodynamic inlet valve feeds a combustion chamber adapted to develop a pulsating pressure, e.g. as in the case when thrust or pressure waves by detonating gases are generated, the introduction of atmospheric air into the valve compartment should take place in a somewhat tangential direction; for this purpose, the air duct should be oriented tangentially to a circle centered on the axis of the inlet valve and the detonation chamber supplied thereby so that a twist is developed in the gas mixture. The other component, i.e. a fuel gas, is introduced into the valve compartment with an externally provided kinetic energy, preferably derived from the nozzles mentioned above. The fuel-gas nozzles have their axes tangential to the same circle with a similar orientation and are somewhat off-radial so that they are inclined to a plane perpendicular to the axes of the combustion chamber at a slight angle in the direction of flow of the gas mixture and develop a barrier designed to intercept that portion of the detonation wave propagated in the rearward direction.

According to yet another feature of this invention, an aerodynamic outlet valve for a combustion chamber operating with pulsating pressure, as mentioned above, has the aforedescribed reflecting surface in the region of a conventional supersonic thrust diffuser adapted to reduce the shock wave developed at the outlet side of the valve or the mouth of the working chamber. The outlet side of the valve can, moreover, have a progressively varying cross-section.

The above and other objects, features and advantages of the present invention will be more readily apparent from the following description, reference being made to the accompanying drawing, in which FIG. 1 is an axial cross-sectional view of the combustion chamber of a gas-turbine installation provided with inlet and outlet valves according to the present invention;

FIG. 2 is a cross-sectional view similar to FIG. 1 but illustrating a modified detonator, according to this invention;

FIG. 3 is an enlarged detailed view of the region III of FIG. 2; and

Figure 4:
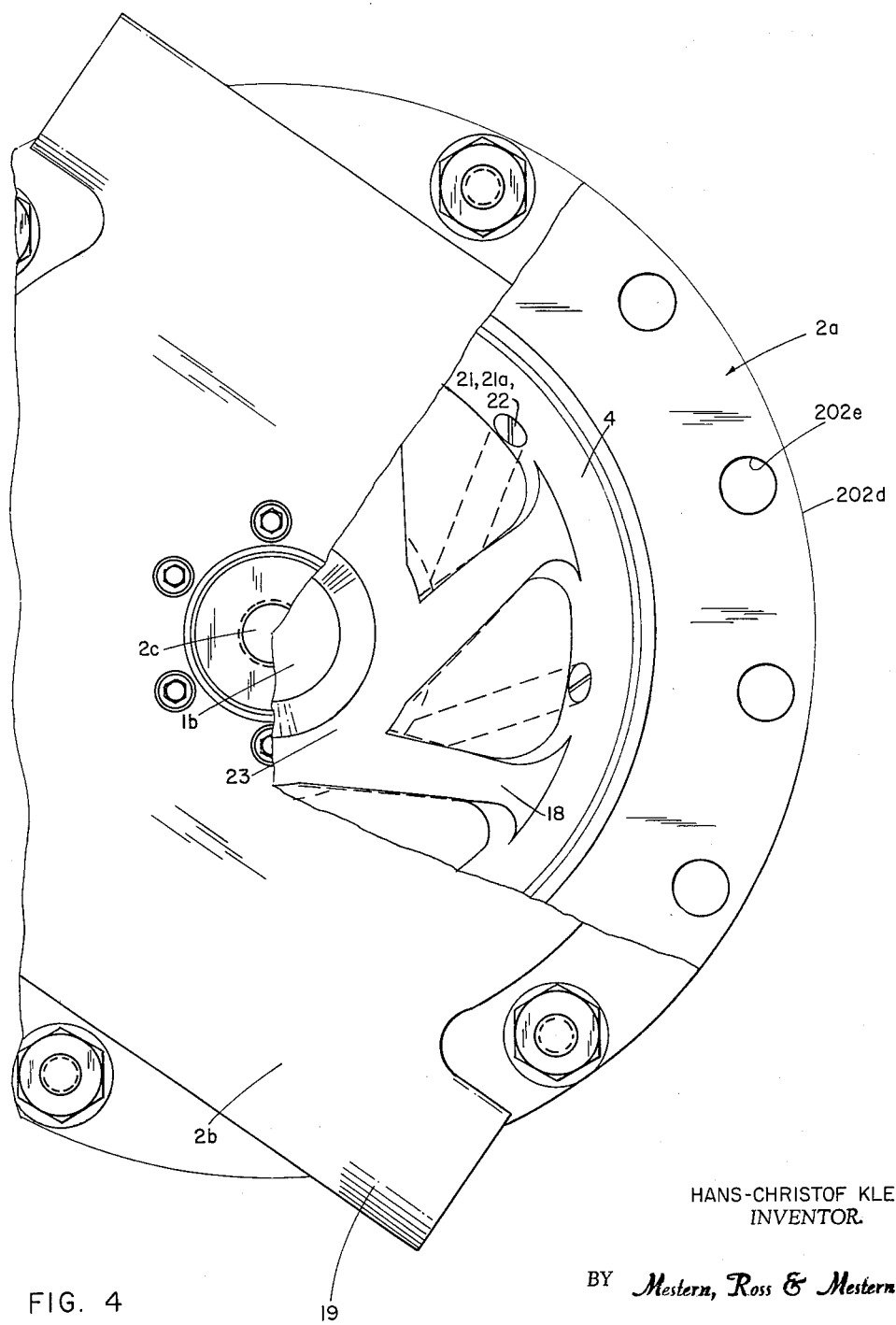
FIG. 4 is the end view in the direction of arrow IV of the device of FIG. 2, with the cover thereof partly broken away.

In FIG. 1, I show a detonating device which communicates with the antechamber 100 or precombustion and distribution chamber of a gas turbine. The detonator comprises a combustion chamber 101 having a reflection compartment 101a, whose function will become apparent hereinafter, and a reaction compartment 101b which extends into the inlet valve 102 of the detonator.

The latter is also provided with an outlet valve generally designated 103 which communicates with the antechamber 100 of the gas turbine via an outwardly flared diffuser bell 125. Inlet valve 102 is provided with an intake duct 104 for an oxidation medium constituting one component of the gas mixture to be ignited or detonated in the combustion chamber 101. This medium can be atmospheric air or an oxidant of the type used in reaction engines for chemically combining with the fuel in an oxidation process. An annular supply conduit 105 is provided for introduction of the combustible mixture or detonatable gas mixture (fuel) which is fed to the conduit 105 by a tube 105a. The ignition device can be a conventional spark plug inserted generally axially in the central body 104a of the intake duct in a manner illustrated, for example, in FIG. 2 with the ignition being initiated in the reaction compartment 101b. Alternatively, the spark plug can be inserted generally radially as indicated by the dot-dash lines 101c in the detonation chamber 101.

The pressure or thrust wave resulting from the detonation of the combstion gases within chamber 101 is intercepted by the inlet valve 102 and follows a state of reduced pressure at the inlet during which atmospheric air or oxidizer is drawn into the detonation chamber via one annular or a plurality of angularly spaced channels 106 from the intake 104. The channel or channels 106 are constituted as one or more Laval nozzles which, in the usual manner, permit the unidirectional flow of gases from the inlet side to the outlet side of the nozzle but restrict reverse flow therethrough. For the purposes of the present disclosure, a Laval nozzle or Laval-type nozzle will be considered to be a nozzle having a constricted throat portion between an inlet side and an outlet side, the inlet side having a larger diameter than the outlet side whereby the gases tend unidirectionally to flow past the constriction forming the throat and countering less resistance in its flow from inlet side to outlet side than in the reverse direction. Generally, the inlet side of the nozzle converges in the direction of the constriction or throat at a much greater angle than the angle of divergence of the bell-shaped outlet side leading away from the constriction. The constriction thus ensures that a gas under pressure at the inlet side will flow through the nozzle and be discharged at the outlet side with a higher velocity so that the nozzle, in effect, converts potential or pressure energy of the gases into kinetic energy of movement. The constriction can be annular in character, e.g. as a consequence of the provision of a central body within an aperture, and/or can be formed by inwardly pinched portions of a duct.

In a reaction chamber or other device not illustrated herein, a combustible gas mixture or a fuel is produced at an elevated pressure, this gas mixture being supplied to the duct 105 via tube 105a and flowing through the Laval-shaped nozzles 107 to emerge at the apertures 105b in the region of the aerodynamic valve 102 at which the air or oxidant enters the combustion chamber 101 at an elevated velocity. The Laval character of the channel or channels 106 imparts to the valve 102 the function of a one-way (unidirectional) valve, preventing reverse flow. Thus the thrust or pressure wave generated by each new detonation cannot escape through the intake 104. The nozzles 107 are directed at an angle to the main axis of the detonation chamber 101 and the aerodynamic valve 102 in such sense that the kinetic energy inherent in the incoming combustion-gas stream from the nozzles 107 forms an additional barrier intercepting each detonation wave as it is generated on the inlet side of the detonation chamber. The term "unidirectional valve" is used herein to denote a valve restricting the reverse flow of gases therethrough.

At the discharge side of the detonation chamber 101, the device provided with an outlet valve 103 as indicated above, valve 103 constitutes another unidirectional valve admitting the operating gases produced by combustion of the oxidizer and fuel into the antechamber of a gas turbine in such manner as to prevent or restrict reverse flow. Since the antechamber of the turbine is usually maintained at an elevated constant pressure, the outlet valve 103 also serves to transform the kinetic energy of the discharge gases into potential energy or pressure. For this purpose, the valve 103 is provided with a constricted discharge channel 108, functioning as a Laval-type nozzle and forming a pressure or thrust diffuser. A diffuser body 109 is disposed centrally within the discharge duct 108 and held there by a plurality of angularly spaced guide ribs 110 which, like the nozzles 107 and the channels 106, can be tangentially oriented. The diffuser 109 has a surface extending transversely to the axis of the combustion chamber 101 and the inlet and outlet valves 102, 103 and juxtaposed with a surface 112 extending similarly in the reaction compartment 101b. Surface 111 reflects a portion of the detonation-thrust wave back toward the reaction chamber 101b against the reflector surface 112 of the inlet valve. The remainder of this thrust wave passes through the channel 108 and its kinetic energy is transformed into potential energy as indicated above. After an initial ignition of the combustible mixture, the pressure wave is followed by a reflected wave which, in the conventional manner, blocks the influx of fuel and/or oxidizer until the combustion gases, with a violent rush, are partly discharged from the detonation chamber and supplied via the diffuser outlet 125 to the turbine. This violent rush of gases is followed by a reduced pressure state in chamber 101, the oxidizer medium being drawn into the chamber during this stage. The kinetic energy of the fuel or aiding gas stream produced by an external source as indicated above supplements the reflection surface 112 and the Laval-action of channels 106 in intercepting the pressure wave. The result is a succession of detonation pulses in a conventional manner.

Since a constant high pressure is maintained in the working chamber 100 of the apparatus, the aerodynamic outlet valve 103 cannot function sufficiently effectively as a unidirectional valve preventing the reverse flow of gases without the additional means for producing the auxiliary barrier referred to above. In the case of the outlet valves, the detonator 101, which constitutes the chamber into which the inlet valve 102 discharges, serves as the source of gases for the outlet valve 103. The passage 108 of this outlet valve is of progressively widening cross-section along its length and has a wall 113 defined by a cylindrical surface provided with the annular concavity 114 from which a part of any gases flowing rearwardly from the working chamber are deflected transversely to the gas stream (as indicated by the arrows 114a). This reflected portion of the rearwardly urged gases, arising because of the high pressure in the working chamber 100, produces an aiding gas stream which limits the flow-through in the rearward direction in that the aiding gas stream is directed in intercepting relationship with this flow and forms a barrier therefor. In the progressively widening outlet 125, the combusted gases are expanded to the working pressure. It is thus evident that the inlet valve 102 and the outlet valve 103 of the device of FIG. 1 both constitute Laval-type nozzles with the nozzle 107 being also of the Laval type.

The detonator illustrated in FIG. 2 has elements functioning similarly to those of FIG. 1 identified with similar reference numerals with respect to the tens and units digits. In this embodiment, the central diffuser body 209 is streamlined and formed with an axial point or apex 215 instead of the reflecting surface 111 described above. An annular reflecting surface 216 is, however, provided, as will be apparent hereinafter. The outlet valve 203 of this embodiment is formed by a bushing 230 whose annular flange 217 is clamped between the rear wall 231 of a water jacket 232 and the detonation tube 201. The transverse annular face 216 of this bushing 230 constitutes a reflecting surface juxtaposed with the reflecting surface 212 of the inlet valve 202.

The inlet valve 202 (FIGS. 2 and 4) comprises a valve body or housing 202a whose annular flange 202d is provided with angularly spaced bores 202e, receiving bolts 202f, by which a cover plate 202b is joined to the valve body 202a. The cover 202b is formed with a recess 202g in which an inset 202h is bolted via screws 202i. The inset 202h forms a socket 202c for a spark plug 202j which represents any ignition device for the detonations of FIGS. 1 and 2. The cover plate 202b is further provided with an annular manifold duct 204 communicating with the inlet channels 218 for introducing air or an oxidant to the inlet 223 of the valve 202. The oxidizing medium is drawn into the valve when the latter is at a reduced-pressure state (after each detonation wave). The channels 218 are inclined to a plane perpendicular to the axis of the detonation tube 201 and inlet valve 202 in the direction of flow of gases therethrough and are also inclined to the axis while extending generally tangentially to a circle centered thereon. Thus the air or other oxidizing media drawn into the detonation chamber, in addition to being of increased velocity, are given a rotary component of movement causing them to twist about the axis in the vortex compartment 223.

The fuel gas is introduced at an elevated pressure from an auxiliary source so as to form the supplemental barrier intercepting the detonation wave. The annular inlet 205 of the fuel gas mixture is provided with a radial connecting fitting 205a and communicates with a duct 220 in the valve body 202a. Duct 220, in turn, feeds the fuel gases at an elevated pressure from the external source to the Laval-nozzle 222 of a discharge duct 221, similarly inclined tangentially to the axis and the plane perpendicular thereto. This is shown in greater detail in FIG. 4. The Laval-nozzle 220 ensures that the potential energy of the gas under pressure in annular conduit 205 will be transformed to kinetic energy of movement of the gas ejected from the nozzle at high velocity. A plug 221a closes the Laval-nozzle while the latter is soldered in the duct 221. It should be noted that, in addition to the conventional interception of a pressure wave by means of a vortex of gases induced through the inlets 218, the present invention makes use of an auxiliary barrier deriving from the kinetic energy of the fuel gases introduced under the pressure of an external source via the Laval-nozzle 222. The duct 205 is formed by a distribution ring 205c which is bolted onto the surface of valve 202a remote from cover plate 202b. The inner tube 233 of the water jacket is threaded onto a boss 202k of valve body 202a which serves as a seat for the combustion tube 201. The wall 231 of the jacket is threaded onto the inner tube 233 and carries, along with the wall 234, the outer shell 235 of the jacket to which water can be supplied via fittings 236, 237.

At the outlet valve 203 of the reflecting chamber 201a, which functions with the detonation technique described in connection with FIG. 1, communicates with the outlet tube 225 which progressively widens and is connected with the antechamber 100 of the type previously described. The outlet 225 is threaded into an end plate 238 which is bolted to wall 231 via screws 239 and clamps an intermediate ring 226 against a washer 226a and a bushing 230. The streamlined ribs 210 support a diffuser body within the channel 208 which is defined by a passage wall 213 (FIG. 3) provided with the reflecting surface 214. In both the embodiments of FIGS. 1 and 2, this reflecting surface is juxtaposed with an outwardly converging surface 109a, 209a of the diffuser body. The reverse flow of gases in this embodiment (arrow 209b) also produced the aiding gas stream and barrier previously described to supplement the unidirectional action of the Laval-nozzle and valve 203. The approximate direction of the reflected stream generally transverse to the main flow 209b of any rearwardly thrust gases is designated by the arrows 214a.

The invention described and illustrated is believed to admit of many modifications within the ability of persons skilled in the art, all such modifications being considered within the spirit and scope of the appended claims.

I claim:

1. An aerodynamic valve for the introduction of gases into a chamber, comprising a valve housing formed with an axially extending passage having an inlet side connectable with a source of said gases and an outlet side communicating with said chamber, said inlet and outlet sides being dimensioned so as to impede the flow of gas rearwardly from said outlet side through said inlet side to a greater extent than the flow of gas forwardly from said inlet side through said outlet side; and means including at least one nozzle opening into said passage and having an axis generally transverse to the axis thereof for directing a gas stream with a relatively high kinetic energy into said passage generally transversely to the flow of gas therethrough for developing a gas barrier in said passage, thereby further limiting the rearward flow of gas, said chamber constituting a combustion chamber adapted to generate periodic thrust waves by the pulsed ignition of a combustible gas in the presence of an oxidation medium, said inlet side of said valve being provided with a plurality of generally tangential ducts for the introduction of said oxidation medium into said chamber via said passage, said nozzle having an axis oriented tangentially with respect to a circle centered on the axis of said passage and common to said ducts, said nozzle being inclined toward said axis of said passage in the forward direction of flow of gas therethrough for introducing said combustible gas thereto.

2. A valve as defined in claim 1 wherein said housing is formed with a forwardly concave reflection surface rearwardly of said ducts and said nozzle at one axial end of said passage, said combustion chamber being provided with another reflecting surface extending transversely to the axis of said passage and juxtaposed with said concave surface and remote therefrom for developing a reflected thrust wave following each detonation of combustible gas within said chamber.

3. A valve as defined in claim 2 wherein said housing is provided with an annular manifold communicating with said ducts, said nozzle being partitioned from said manifold.

4. A valve as defined in claim 3, further comprising ignition means extending generally axially into said passage through said concave surface.

5. A valve as defined in claim 1, further comprising aerodynamic outlet-valve means at an end of said chamber remote from said passage and communicating with a working chamber at an elevated pressure, said outlet-valve means being provided with a reflecting surface for deflecting at least part of any rearward flow of gases from said working chamber generally transversely thereto to provide a gas barrier at said outlet valve means impeding the rearward flow of gases therethrough.

6. A valve as defined in claim 5 wherein said outlet-valve means is formed as a Laval-type nozzle oriented in the forward direction of flow of gases from said combustion chamber into said working chamber.

7. A valve as defined in claim 1 wherein said nozzle is a Laval-type nozzle for transforming potential energy of said combustible gas at an elevated pressure into kinetic energy of a moving gas stream.

8. An aerodynamic valve for the introduction of gases into a chamber under pressure, comprising a valve housing formed with an axially extending passage having an inlet side connectable with a source of said gases and an outlet side communicating with said chamber, said inlet and outlet sides being dimensioned so as to impede the flow of gas rearwardly from said outlet side through said inlet side to a greater extent than the flow of gas forwardly from said inlet side to said outlet side, said passage having a wall at said outlet side oriented so as to deflect at least part of any gas stream flowing from said chamber rearwardly through said valve generally transversely to the rearward direction of flow, thereby developing a gas barrier at said outlet side to limit further the rearward flow of gases fom said chamber, said source being a detonator adapted to generate periodic thrust waves by the pulsed ignition of a combustible gas in the presence of an oxidation medium, said valve further comprising a diffuser body axially disposed in said passage with clearance from the wall thereof for admitting part of the thrust waves of gas into said chamber, said wall of said passage being formed with an annular concavity constituting said surface.

9. A valve as defined in claim 8 wherein said outlet side of said valve has a progressively increasing cross-section.

10. A valve as defined in claim 8 wherein said detonator is provided further with aerodynamic inlet-valve means remote from said valve and provided with means including at least one nozzle for directing a gas stream with a relatively high kinetic energy into said detonator for developing a gas barrier intercepting the rearward thrust of said waves.

References Cited by the Examiner
UNITED STATES PATENTS

| | | | |
|---|---|---|---|
| 2,543,758 | 3/1951 | Bodine | 60—39.77 X |
| 2,612,749 | 10/1952 | Tenney | 60—39.77 X |
| 2,825,202 | 3/1958 | Bertin | 60—39.77 X |

MARK NEWMAN, *Primary Eaxminer.*

RALPH D. BLAKESLEE, *Examiner.*